Oct. 11, 1949. J. RINNE 2,484,119
PARALLEL MOTION AND PICKER STICK SNUBBER
Filed April 21, 1948

INVENTOR.
JOHN RINNE
BY
Virgil F. Davies
ATTORNEY

Oct. 11, 1949.  J. RINNE  2,484,119
PARALLEL MOTION AND PICKER STICK SNUBBER
Filed April 21, 1948  2 Sheets-Sheet 2
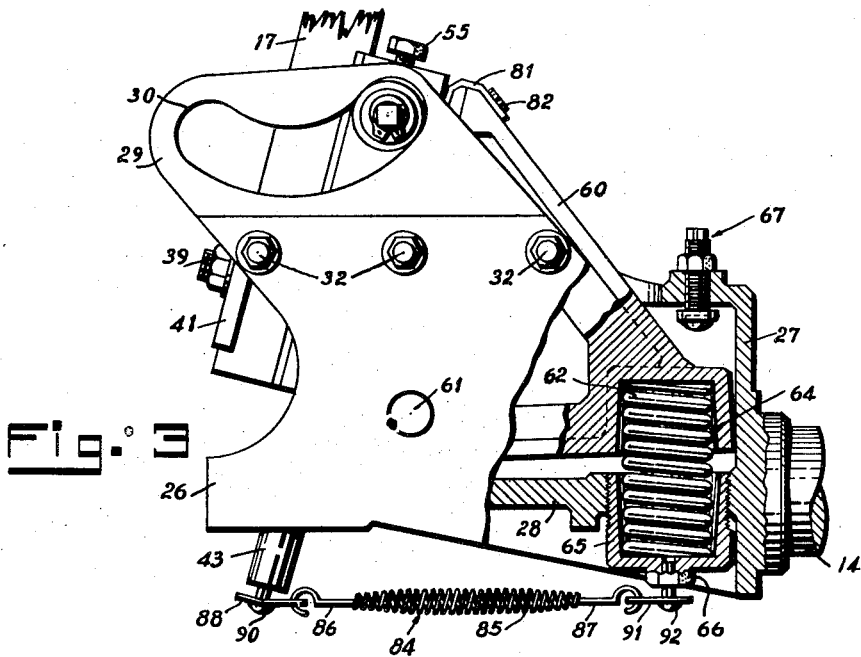
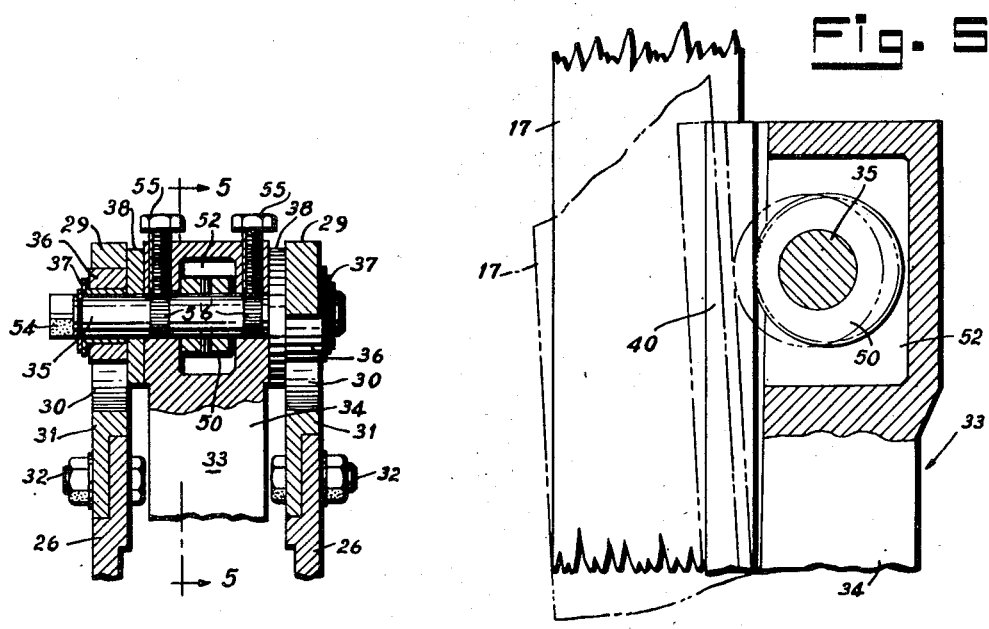
INVENTOR.
JOHN RINNE
BY
Virgil F. Davies
ATTORNEY Patented Oct. 11, 1949

2,484,119

UNITED STATES PATENT OFFICE 2,484,119

PARALLEL MOTION AND PICKER STICK SNUBBER

John Rinne, Brooklyn, N. Y., assignor to The M. W. Kellogg Company, Jersey City, N. J., a corporation of Delaware Application April 21, 1948, Serial No. 22,473

18 Claims. (Cl. 139—149)

1

The present invention relates to parallel motions and picker stick snubbers for fly shuttle looms.

A parallel motion serves to guide a picker stick in its angular picking movement and to cause thereby its effective or picker end to follow a path substantially parallel to the raceway or lay. The overthrow force of the picker stick is deadened and the stick finally checked by a picker stick snubber after reaching shuttle delivery position.

One object of the present invention is to provide a new and improved parallel motion which is comparatively simple but nevertheless effective in operation, which affords better controlled parallel movement of the picker end of the stick in a steady, smooth manner, without jumping or wavering of said stick even at high speeds, which is constructed to permit easy replacement of its more wearable guide parts, which permits easy angular adjustment of the picker stick with respect to the stick mounting part of said parallel motion, which mounts the picker stick in the manner to equalize the operating and reactionary stresses thereon and which is provided with a simple but nevertheless effective spring return motion for the picker stick.

Another object of the present invention is to provide a new and improved picker stick snubber which affords controlled effective shock absorption of the forces on the picker stick during its overthrow movement, which lends itself to easy and effective adjustment for selective control of the preloading force on the snubber spring, which is mounted and operated to impart minimum of shock impact to the loom, which is subject to a minimum of inertial forces, and which is combined with the parallel motion to operate in conjunction therewith and to form therewith a unit.

Various other objects of the invention will be apparent from the following particular description and from an inspection of the accompanying drawings, in which:

Fig. 3 is a front elevation of the combined parallel motion and picker stick snubber unit shown with parts broken away to reveal the interior structure of said unit and with the picker

Figures 1, 2:
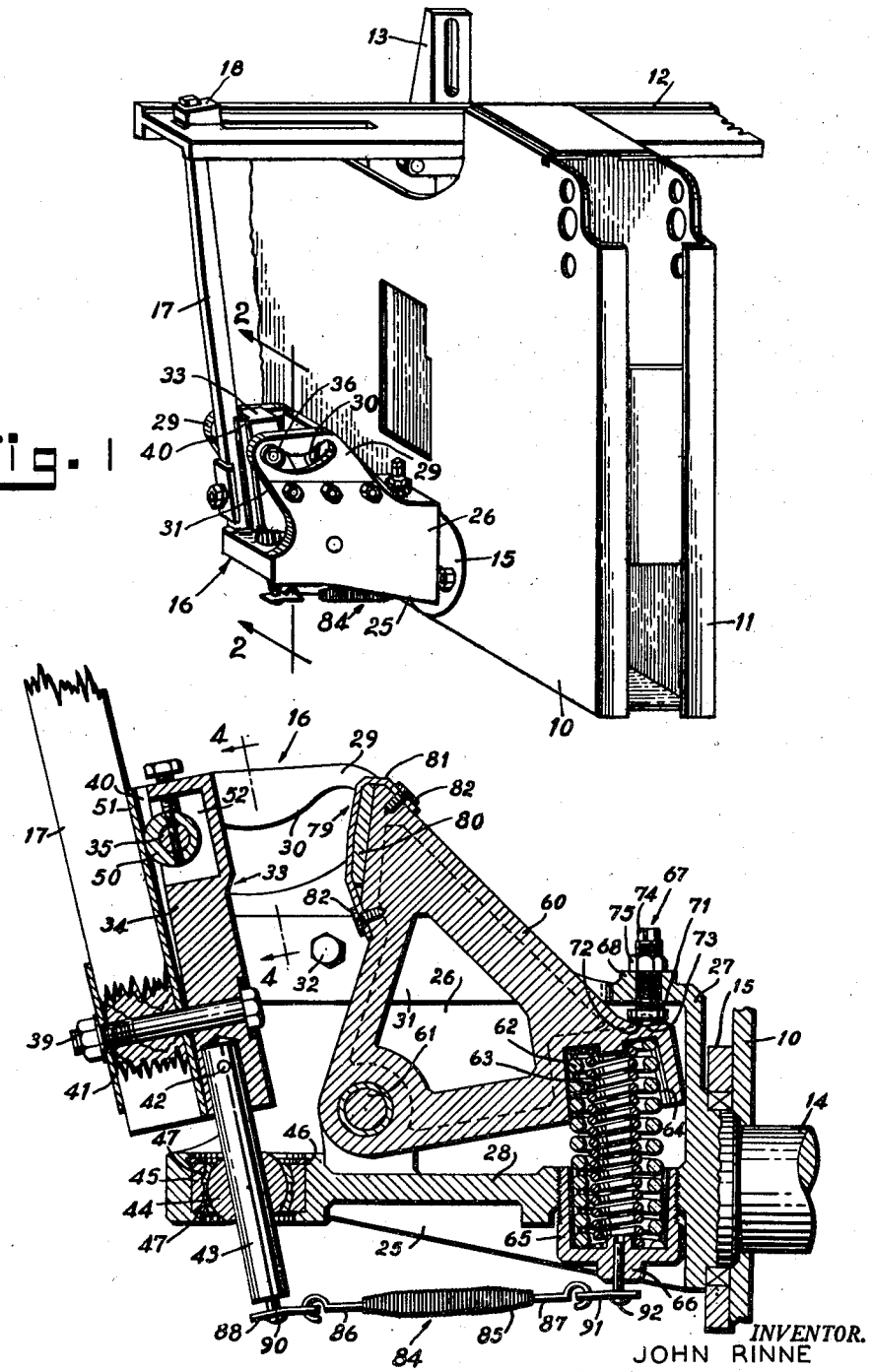
Fig. 1 is a perspective of the left loomside showing a combined parallel motion and picker stick snubber embodying the present invention.
Fig. 2 is a section of the combined parallel motion and picker stick snubber unit taken approximately along the lines 2—2 of Fig. 1 and showing the picker stick at the beginning of its picking or shuttle delivery motion.

2 stick fully checked at the end of its overthrow movement;

Fig. 4 is a detail section taken approximately along the lines 4—4 of Fig. 2; and Fig. 5 is a detail section taken approximately along the lines 5—5 of Fig. 4 but showing the parts on a larger scale.

The drawings show only the left side of the loom, but it must be understood that the parallel motion and the picker stick snubber on the right side of the loom are of similar construction. Each of the loomsides may be of the conventional single plate type or may be of the improved double web type shown in copending application Serial No. 691,237, filed Aug. 17, 1946. In accordance with this improved type, each of the loomsides comprises a pair of parallel upright plates 10 and 11 cross-braced as indicated in the aforesaid copending application. A lay 12 extending crosswise of the loom is operated from swords 13, each located between the plates 10 and 11 of each corresponding loomside and each secured to a respective rocker shaft 14. Each of the rocker shafts is journalled in a bearing 15 affixed to a corresponding frame plate 10 and in a bearing (not shown) in the other corresponding frame plate 11 and has a projection beyond the outer side of the plate 10 carrying a parallel motion 16 for a picker stick 17. The picker stick 17 extends through the lay 12 and into a shuttle box (not shown) and carries at its upper end a picker 18 for engaging the shuttle.

The parallel motion 16 comprises a generally U-shaped frame structure 25 integral with or otherwise secured to the rocker shaft 14 for rocking movement therewith. The frame structure 25 may be a unitary structure and comprises substantially parallel upright side plates 26 connected together at their inner ends by a back plate 27 and at their bottoms by a base plate 28. The side plates 26 detachably carry a pair of picker stick guides 29 located symmetrically on opposite sides of the longitudinal axis of the picker stick 17. Each of the guides is in the form of a plate having a curved cam or guide slot 30 extending generally in a substantially horizontal direction with its concave side facing upwardly and is mounted on the upper edge section of a corresponding side frame plate 26 by means of a half-lapped joint 31. Bolts 32 through the overlapping sections of the plate 26 and the plate 29 removably secure the plate 29 to the plate 26. Thus, the plates 29 which are subject to wear may be quickly and inexpensively replaced.

Disposed between the plates 29 and guided thereby, is a guide follower 33 comprising a block 34 carrying an axle 35, the ends of which support the rotatable follower rollers 36 riding in respective guide slots 30. The follower rollers 36 are retained against axial movement outwardly by any suitable means, as for example, by snap rings 37 and are held against inward movement by means of the washers 38 retained with slide fits in the clearances between the sides of the follower block 34 and the plates 29. The washers 38 are subject to wear, but can be easily and inexpensively replaced.

The double guiding action afforded by the plates 29 on opposite sides of the picker stick 17 gives better guiding control of the picker stick 17 and aids in holding said stick against twisting during operation.

The picker stick 17 is connected at its lower end to the guide follower 33 by means of a bolt 39 and a pair of flanges 40 on said follower closely flanking said picker stick. Since the picker stick 17 is desirably made of wood as in conventional looms, the nut on the bolt 39 bears against a metal plate 41 on the outer side of said picker stick.

The picker stick 17 is supported near its lower end for pivotal movement and is guided for substantially endwise movement. For that purpose, there is secured to the lower end of the guide follower 33 desirably by means of a pin 42, a guide rod 43 extending with a slide fit in a bearing 44 mounted for universal movement. The bearing 44 is in the form of a substantially spherical ball embracing the guide rod 43 with a snug slide fit and supported in a bearing ring 45 fitted in a recess in the base plate 28 of the parallel motion frame structure 25. The bearing ring 45 is retained in the recess by a snap ring 46 and is lined with a pair of bushings 47 press-fitted into the ring 45 from opposite sides thereof. The bushings 47 have outer conical surfaces and inner spherical seating surfaces for the ball 44.

As the picker stick 17 is angularly reciprocated about the center of the bearing 44 by a picking motion (not shown), it is moved endwise by the guide connection between the lower end of said stick and the parallel motion to maintain the picker end of said stick along a course substantially parallel to the lay 12. At the same time, the picker stick 17 is guided for endwise movement by the bearing 44 while said bearing is permitted to move about its center as a result of any slight rocking that might occur from inaccuracies or the like. The universal connection afforded by the bearing 44 provides a floating mount for the picker stick 17 and thereby reduces shocks and vibrations incidental to the operation of said picker stick.

The picker stick 17 is operated in any suitable manner, as for example, by the conventional type of picking motion (not shown), in which a pick cam, as its projecting part or nose strikes a cam follower connected to one arm of a bell crank, draws the picker stick towards the side of the loom by means of a connection comprising a lug stick secured to the other arm of said bell crank and a lug strap between said lug stick and the picker stick.

The angular position of the picker stick 17 with respect to the guide 33 can be adjusted. To that end, the axle 35 carrying the guide follower rolls 36 has pinned or otherwise secured to its intermediate section a knurled cylindrical roll 50 eccentrically mounted with respect to said axle and bearing against the inner side of the picker stick 17 through an intervening metal bearing plate 51. In order to receive this eccentric roll on the intermediate portion of the axle 35, the guide follower 33 is provided near its upper end with a recess or hollow 52 and the outer side of said follower at the hollow part thereof is open so that said eccentric roll bears against the picker stick through the intervening plate 51 and along a line extending substantially across the full width of the picker stick 17. This type of stick adjusting arrangement eliminates point contact afforded by set screw type of adjustment and by its line contact between the eccentric adjusting roll 50 and the plate 51 prevents twisting of the picker stick 17.

In order to rotate the eccentric roll 50 for adjustments in the angular position of the picker stick 17 with respect to the guide follower 33, the front end of the axle 35 has a head 54 of square or other polygonal shape to receive a suitable turning tool. By turning the head 54, the axle 35 may be turned about its supports and the eccentric roll 50 turned to effect angular adjusting movement of the picker stick 17 with respect to the guide follower 33 as shown in Fig. 5. This adjustment in the rotative position of the eccentric roll 50 is made while the bolt 39 is loose. After the proper adjustment in the eccentric roll 50 is made, the adjusted position of said roll is maintained by means of a pair of locking studs 55 threaded into the upper end of the guide follower 33 and impinging upon the surface of the axle 35. To assure the locking of the axle 35 against rotation by the studs 55, the sections of said axle against which said studs bear are provided with knurled surfaces 56. If desired, the peripheral surface of the eccentric roll 50 may also be knurled as shown, to afford non-slipping contact between said roll and the bearing plate 51.

After the angular adjustment of the picker stick 17 has been made and the locking studs 55 have been screwed into locking position against the knurled axle surfaces 56, the bolt 39 may be securely tightened.

The picker stick snubber operative during the overthrow movement of the picker stick 17 comprises a bumper 60 having tapering sides in a form of a wedge and shown specifically of substantially triangular cross-section. The bumper 60 is mounted for rocking movement between the sides 26, 29 of the parallel motion and is pivotally supported at one of its apex sections 61 to the frame plates 26 near the base frame plate 28. The bumper 60 is preloaded angularly towards the guide follower 33 by means of a spring device shown comprising a pair of oppositely sensed concentric coil springs 62 and 63, extending at one end into a recess 64 in the bumper 60, and retained at the other end in a cup member 65 mounted on the base frame plate 28. The cup member 65 is desirably adjustable in the base frame plate 28 to permit adjustments in the initial preloading stress on the springs 62 and 63. To that end, the cup member 65 is threaded into the base frame plate 28 and has at its lower end an axial projection 66 desirably of hexagonal or other polygonal shape to receive a wrench or other suitable turning tool.

The preloaded initial position of the bumper 60 is determined by means of a stop pin 67 threaded into a flange 68 forming an upper horizontal extension of the back frame plate 27 of the frame structure 25. The stop pin 67 has at its lower end a head 71 with a recess into which is securely fitted a rubber button 72 against which a shoulder 73 on the bumper 60 is adapted to engage in the preloaded position shown in Fig. 2. The pin 67 has a polygonal extension 74 at its upper end for receiving a suitable turning tool and is locked in adjusted position by means of a lock nut 75.

The side of the bumper 60 which is adapted to be struck by the guide follower 33 during overthrow movement of the picker stick 17 has a cushioning device 79 comprising a pad 80 of rubber or similar resilient material retained in position by means of a flexible sheet 81 of leather or the like secured in position over said pad by studs 82.

The cushioning device 79 moves in an arcuate path which has a downward component when the springs 62 and 63 are compressed and an upward movement when the springs 62 and 63 are expanded. The striking portion of the guide follower 33 moves in an arcuate path which has an upward component when springs 62 and 63 are compressed and a downward component when springs 62 and 63 are expanded. Hence, during joint movement of the cushioning device 79 and the striking portion of the guide follower 33 there is a relative sliding movement between them which with the force applied holds them together and assures a smooth continuous action and a gradual and smooth transmission of the force from the picker stick 17 to the bumper 60. Thus, after the striking portion of the guide follower 33 contacts the cushioning device 79 during the overthrow movement of the picker stick 17 this movement is yieldably resisted by springs 62 and 63 under compression and is progressively checked or retarded thereby until it is stopped.

The return movement of the picker stick 17 may be effected entirely by the expansive return action of the springs 62 and 63 or partially by said expansive action and partially by means of a spring return motion 84.

The spring return motion 84 comprises a coil spring 85 having hooks 86 and 87 at the ends thereof. The hook 86 fastens to a link 88 of leather, or other similar flexible material, secured to a pin or stud 90 mounted on the lower end of the guide rod 43. The hook 87 fastens to a similar link 91 secured to a pin or stud 92 affixed to the lower end of the spring adjusting cup member 65.

In Figs. 1 and 2 of the drawings, the picker stick 17 is in extreme outer position. In this position, the shuttle is in the box and is engaging the picker 18. As the projecting or toe portion of the pick cam is riding underneath the pick cam follower, the picker stick 17 is moving from the position shown in Figs. 1 and 2 towards the side of the loom and at the same time is propelling the shuttle along the lay 12 and across the loom. When the peak of the projecting portion or nose of the pick cam reaches underneath the pick cam follower, the picker stick 17 will be moving at maximum speed and will be in shuttle delivery position. The momentum of the pick cam follower at this phase will cause it to continue in its outward radial movement with respect to the pick cam. This excess movement of the pick cam follower is transmitted to the picker stick 17 and causes it to move beyond shuttle delivery position. The shuttle starts to leave the picker 18 when the picker stick 17 reaches this shuttle delivery position. The bumper 60 is disposed in such initial position as to engage the guide follower 33 initially when the picker stick 17 reaches a position slightly beyond shuttle delivery position. As the picker stick 17 travels through its overthrow part of the stroke, it pushes bumper 60 clockwise (Fig. 2) against the action of the springs 62 and 63, thereby gradually checking the picker stick 17 until it reaches the position shown in Fig. 3. The stick arresting action of the springs 62 and 63 is assisted by the return spring 85. Before the picker stick 17 reaches the end of its overthrow, the picker stick will have been almost completely arrested. After being completely checked, the picker stick 17 will return towards its original outward position first under the combined action of the springs 62, 63 and 85, and then solely under the action of the spring 85.

In view of the fact that the bumper 60 is located near the base of the loom, and the springs 62 and 63 are disposed with their axis almost vertical and transmit the force of said bumper downwardly against the base frame plate 28, the impact of the picker stick 17 during its overthrow is effectively dampened without setting up excessive shocks or vibrations in the loom, and without transmitting this impact to the lay 12 or to the loomsides transversely thereof.

Also, since the impact picker stick force on the bumper 60 is transmitted to said bumper at a section thereof close to the pivot support thereof, the amount of inertial forces set up in said bumper are reduced to a minimum.

While the invention has been described with particular reference to a specific embodiment, it is to be understood that it is not to be limited thereto but is to be construed broadly and restricted solely by the scope of the appended claims.

What is claimed is:

1. In a parallel motion for the picker stick of a loom, the combination comprising a frame structure having a substantially horizontal base plate, a guide connected to said frame structure, a guide follower adapted to be secured to the lower end section of said picker stick, and having follower engagement with said guide to move the picker stick endwise as it is oscillated angularly towards and away from the side of the loom, a rod rigid with the lower end of said follower and extending substantially parallel to the longitudinal axis of the picker stick, and a slide bearing for said rod supported on said horizontal frame plate and adapted to guide said rod endwise as said follower is moved by its engagement with said guide.

2. In a parallel motion for the picker stick of a loom, the combination comprising a guide, a guide follower adapted to be secured to the lower end section of said picker stick and having follower engagement with said guide to move the picker stick endwise as it is oscillated angularly towards and away from the side of the loom, a rod rigid with the lower end of said follower and extending substantially parallel to the longitudinal axis of the picker stick, a slide bearing for said rod, and means mounting said bearing for universal movement.

3. In a parallel motion for the picker stick of a loom, the combination as described in claim 2, in which said slide bearing is in the form of a spherical ball having a passage through which said rod slides, and said bearing mounting means comprises a horizontal frame plate having a hole, a bearing ring retained in said hole, and a pair of bushings press-fitted into opposite ends of said ring and presenting inner spherical surfaces for universally seating said ball.

4. In a parallel motion for the picker stick of a loom, the combination comprising a U-shaped frame structure having a base frame plate and side frame plates, guide plates secured to said frame plates respectively, a guide follower adapted to be secured to the lower section of said picker stick and located between said guide plates in follower engagement with said guide plates to move said picker stick endwise during its picking movement, and means for guiding said picker stick in its endwise movement comprising a rod secured to the lower end of said follower and extending substantially parallel to the longitudinal axis of said picker stick, said rod passing through a hole in said base, and a slide bearing in said hole for said rod.

5. In combination, a picker stick, a parallel motion for said picker stick, comprising a guide, and a guide follower secured to the lower section of said picker stick and disposed in follower engagement with said guide, and means for adjusting the angular position of said stick with respect to said follower and comprising an adjusting member mounted on said follower and having a surface adapted to engage the inner side of said stick, and means for moving said adjusting member relative to said follower to move said surface away from said follower and thereby to vary the distance between said stick and said follower near said surface.

6. The combination as described in claim 5, said adjusting means comprising an axle supported on said follower for rotational adjusting movement and said adjusting member is in the form of a cylindrical roll eccentrically mounted on and secured to said axle and extending crosswise of said picker stick.

7. The combination as described in claim 5, comprising a bolt securing the lower section of said picker stick to said guide follower, said adjusting means comprising an axle supported on said follower above said bolt for rotational movement and having an accessible extension beyond one side of said follower shaped to permit turning of said axle, and screw means for locking said axle in adjusted rotative position, said adjusting member being in the form of a cylindrical roll eccentrically mounted on and secured to said axle and extending crosswise of said picker stick.

8. In a loom, a snubber for a picker stick comprising a bumper having tapering sides and pivotally supported near its apex for angular movement about an axis extending lengthwise of the loom, said bumper being located between said picker stick and the side of the loom, one of said sides being adapted to be engaged by a member rigid with the picker stick during overthrow movement of said picker stick, and spring means acting on the other of said sides to resist angular movement of said bumper during overthrow movement of said picker stick.

9. In a loom, a snubber for a picker stick as described in claim 8, said bumper being shaped to cause the side thereof adapted to be engaged by said member to extend substantially in upright position before engagement thereof, said spring means including a compression coil spring having its axis extending with a substantial vertical component.

10. In a loom having a member extending outwardly from and transversely of a loomside thereof, a snubber for a picker stick comprising a pivotally supported bumper disposed in position to be moved angularly about its pivot support by overthrow movement of said picker stick, and a coil spring extending with its axis substantially upright and disposed between said bumper and said member in position to be compressed by said bumper during picker stick overthrow movement and to resist thereby said overthrow movement.

11. In a loom, a parallel motion for a picker stick comprising a pair of spaced guide members, and a guide follower adapted to be connected to the lower end of the picker stick and having follower engagement with said guide members, and a snubber for said picker stick comprising a spring-loaded bumper between said guide members in the path of overthrow movement of said guide follower.

12. In a loom, a parallel motion for a picker stick, comprising a U-shaped frame structure adapted to rock with the sword rocker shaft, and having a pair of side frame plates, a pair of guides connected to said side frame plates respectively, and a guide follower adapted to be connected to the lower end of the picker stick and having follower engagement with said guides, and a snubber for said picker stick comprising a bumper between said side frame plates pivoted to said frame structure and disposed in the path of overthrow movement of said guide follower, and coil spring means between said bumper and said frame structure for resisting overthrow movement of said picker stick.

13. In a loom, the combination as described in claim 12, said frame structure comprising a frame plate connecting the base sections of said side frame plates together, said coil spring means being supported at one end on said base frame plate while the other end engages said bumper.

14. In a loom, the combination as described in claim 12, said frame structure comprising a frame plate connecting the base sections of said side frame plates together, said combination comprising a cup-member threaded in said base frame plate for receiving said coil spring means at one end while the other end engages said bumper, said cup-member being rotatable to adjust the preloading stress on said coil spring means.

15. In a loom, a parallel motion for a picker stick comprising a guide, and a guide follower adapted to be connected to the lower section of said picker stick and having follower engagement with said guide, and a snubber for said picker stick comprising a spring-loaded bumper in the path of overthrow movement of said guide follower, said guide having a guiding configuration extending in a direction to cause said follower to strike said bumper in a direction having a substantial slide component with respect to said bumper.

16. In a loom, a parallel motion for a picker stick comprising a guide plate having a guide slot arcuately curved with its concave side facing generally upwardly, and a guide follower adapted to be connected to the lower section of said picker stick and having follower engagement with said guide slot, and a snubber for said picker stick comprising a spring-loaded pivotally mounted bumper having a surface in the path of overthrow movement of said guide follower, said surface extending substantially in an upright position near an upsweep end of said guide slot furthest from said guide follower, whereby said follower strikes said surface in a direction having a substantial slide component with respect to said surface.

17. In a loom, a snubber for a picker stick comprising a pivotally supported bumper, one side of which is adapted to be engaged by a member rigid with said picker stick during overthrow movement of said picker stick, to urge said bumper angularly about its pivot support in one direction, and spring means acting on the opposite side of said bumper to resist movement of said bumper in said angular direction, said spring means being in the form of compression coil spring means having its axis substantially vertical, whereby the forces on said spring means act in a direction towards the floor supporting the loom.

18. In a loom, a parallel motion having a frame structure adapted to rock with the sword rocker shaft, a picker stick bumper pivotally supported on said frame structure between the picker stick and the side of the loom, in position to be rotated angularly by the overthrow of the picker stick, spring means for resisting overthrow movement of the picker stick, said spring means urging said bumper about its pivotal support angularly towards the picker stick, and an adjustable stop in the form of a screw member threaded into said frame structure for limiting the angular movement of said bumper toward said picker stick.

JOHN RINNE.

REFERENCES CITED

The following references are of record in the file of this patent:

UNITED STATES PATENTS

| Number | Name | Date |
|---|---|---|
| 503,470 | Emery | Aug. 15, 1893 |
| 693,592 | Durkin | Feb. 18, 1902 |
| 739,526 | Whatley | Sept. 22, 1903 |
| 744,862 | Goodwin | Nov. 24, 1903 |
| 825,049 | Goodwin | July 3, 1906 |
| 1,342,726 | Van De Voort | June 8, 1920 |
| 1,529,896 | Landi | Mar. 17, 1925 |
| 2,371,562 | Vanore | Mar. 13, 1945 |

FOREIGN PATENTS

| Number | Country | Date |
|---|---|---|
| 879,862 | France | Dec. 10, 1942 |